United States Patent [19]

Laüfer et al.

[11] 4,022,152

[45] May 10, 1977

[54] APPARATUS FOR MAKING PARTICULATE MATERIALS, PARTICULARLY OXIDES, HYDROPHOBIC

[75] Inventors: Siegmar Laüfer; Waldemar Roy, both of Rheinfelden, Germany

[73] Assignee: Deutsche Gold- und Silber-Scheideanstalt vormals Roessler, Frankfurt, Germany

[22] Filed: Dec. 17, 1974

[21] Appl. No.: 533,675

Related U.S. Application Data

[60] Division of Ser. No. 241,761, April 6, 1972, Pat. No. 3,920,865, which is a continuation-in-part of Ser. No. 23,330, March 27, 1970, abandoned.

[30] Foreign Application Priority Data

Mar. 29, 1969  Germany .......................... 1916360

[52] U.S. Cl. ............................... 118/49.5; 23/260; 427/220

[51] Int. Cl.² ........................................ C23C 13/08

[58] Field of Search ........................... 118/48–49.5; 23/260

[56] References Cited

UNITED STATES PATENTS

| | | | |
|---|---|---|---|
| 3,069,243 | 12/1962 | Brooks et al. | 23/260 |
| 3,551,098 | 12/1970 | Flemmert | 23/260 X |
| 3,560,166 | 2/1971 | Walles | 23/260 X |

Primary Examiner—Mervin Stein
Attorney, Agent, or Firm—Cushman, Darby & Cushman

[57] ABSTRACT

An apparatus for making particulate materials hydrophobic has means for activating the material, means for charging the material with a substance capable of imparting hydrophobic characteristics thereto, means for causing reaction between the material and the substance with which it is charged and means for treating the material subsequent to the reaction so as to remove excess of the substance therefrom.

6 Claims, 1 Drawing Figure

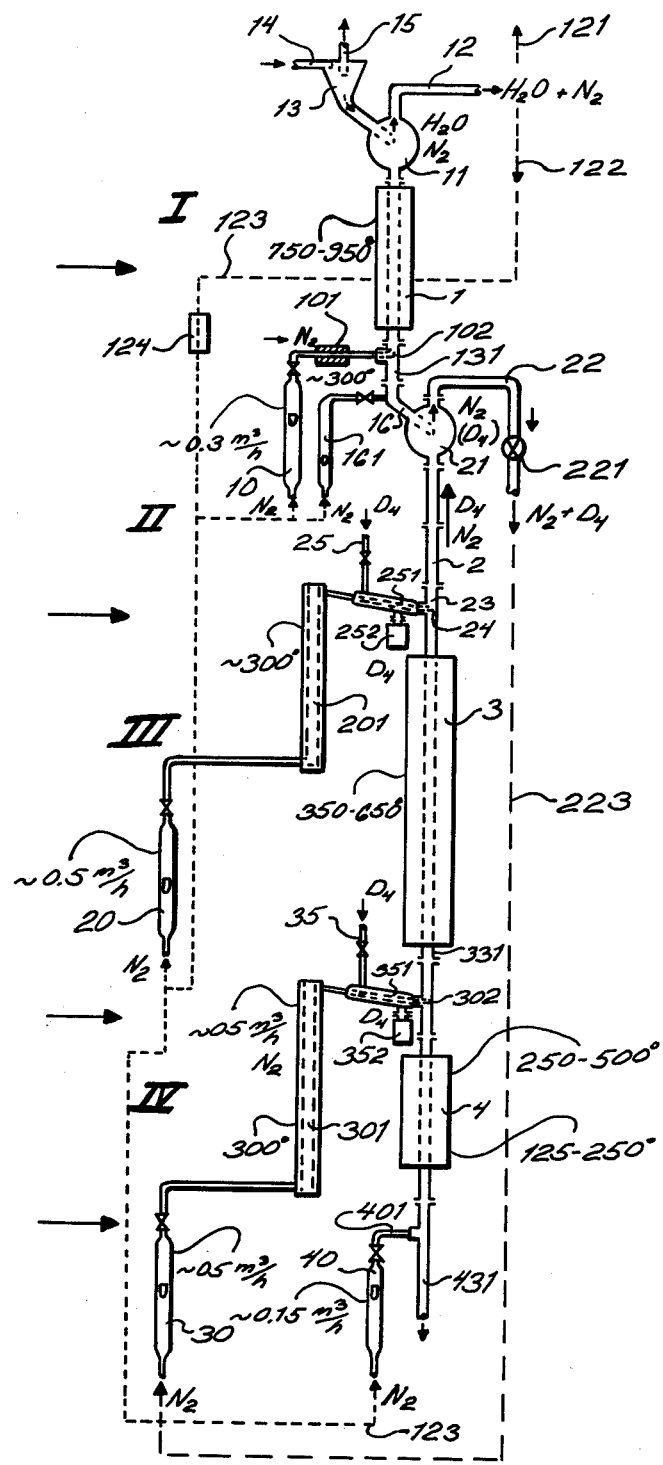

APPARATUS FOR MAKING PARTICULATE MATERIALS, PARTICULARLY OXIDES, HYDROPHOBIC

CROSS-REFERENCE TO RELATED APPLICATIONS

This application is a division of the copending application Ser. No. 241,761 filed Apr. 6, 1972 now Pat. No. 3,920,865 which, in turn, is a continuation-in-part of abandoned application Ser. No. 23,330 filed Mar. 27, 1970.

BACKGROUND OF THE INVENTION

This invention relates to an apparatus for making highly dispersed oxides, mixed oxides and oxide mixtures of metals and/or metalloids hydrophobic by treating the oxide particles with volatilizable organosilicon compounds in the gas phase.

It is known to make highly dispersed oxides (active fillers), which have been obtained by reaction of metal or metalloid compounds or volatile compounds thereof in vapor form, hydrophobic at elevated temperatures in the presence of a hydrolyzing agent and, possibly, an oxidizing agent also. In this process, the oxides are rendered hydrophobic by reaction with a halogen-containing inorganic or organic compound.

Oxide aerogels are usually made by subjecting volatile compounds of metals or metalloids, particularly halides or gas mixtures containing the same, to the hydrolyzing influence of water vapor while the compounds are in the gaseous phase, whereby the resulting oxides, which are present in the aerosol state, form aerogels. These products are then isolated from the easily condensed, gaseous reaction products at a temperature above their dew points. The water vapor-forming gas mixtures can consist of combustible gas mixtures, particularly hydrogen-containing gas mixtures, or compositions which form such mixtures, and also of non-combustible gases, preferably oxygen-containing gases. The oxides obtained have a primary particle size of less than 150 $\mu$, volatile halides, and preferably chlorides and fluorides, may be used as starting materials for this process.

In the preparation of mixed oxides, different metals or metalloids, or compounds thereof which are volatile, are introduced to the thermal reaction as gaseous mixtures simultaneously so as to cause the oxides to separate out in the form of mixed oxides. On the other hand, the preparation of so-called oxide mixtures is effected by subjecting different volatile reaction compounds to the pyrolytic treatment separately but jointly converting the different materials from the aerosol to the aerogel state, i.e. co-coagulating them, so that the oxides obtained are in the form of oxide mixtures. It is also possible to subject different and separate oxides to a mechanical treatment after their preparation for the purpose of combining them to form oxide mixtures.

If halogen-containing starting materials, such as, for example, silicon tetrachloride or silicon tetrafluoride, are used in the thermal reaction, there are obtained products which, as a result of their high adsorption capacities, contain large amounts of hydrogen halide and, in addition, contain halogen directly bound to the metal or metalloid atom. These oxides are strongly acid in their reactions. Their hydrohalic acid content may, for example, amount to 0.1%, so that they have a pH value of about 1.8. These oxides exhibit predominantly hydrophilic properties. In another way there are produced finely dispersed silica particles in a wet process by precipitation.

For many purposes such as, for instance, working highly dispersed filler materials into organic media, it is desirable for the filler material to possess organophilic, that is, hydrophobic, properties. Organo-chlorosilanes and various other agents have been used for this in various processes. Thus, it is known to make pulverulent silicic acid hydrophobic by treatment with alkyl-chlorosilanes so as to form a coating thereon. In this case, however, the chlorosilane present on the surface of the silicic acid adsorbs water giving rise to the formation of hydrochloric acid. The silicic acid which has been made hydrophobic in this manner must be freed from the hydrochloric acid which has formed.

It has also been proposed to make powdery silicic acid hydrophobic with silicone oils. This involves suspending the dry, pulverulent silicic acid in an organic liquid.

Pyrogenic metal oxides which have free OH groups on their surfaces have also been treated with gaseous or readily vaporizable materials such as alcohols, formaldehyde and ketenes, the oxides undergoing etherification, esterification or acetate formation. This treatment has been carried out simultaneously with or subsequent to a hydrolysis with water or steam. In the esterification, there are obtained products which, similar to the relatively unstable products obtained in saponification, do not, in general, meet the requirements for stability in hydrophobic products. The esterification-modified products have not, therefore, achieved industrial importance as truly stable hydrophobic products.

It is further known to make highly dispersed oxides hydrophobic by treating them with silanes in vapor form with the agent for imparting hydrophobic properties being added directly after the formation of the oxide from the halide in the presence of steam and oxygen at a temperature below 500° C. The process of making the oxides hydrophobic takes place in the presence of free hydrogen halide formed during the production of the oxides, the hydrogen halide being present in large amounts. The resulting products have a pH value which does not exceed a value of 2.0.

In the aforementioned procedures, no chemical reactions with the OH groups on the surfaces of the oxides take place but, rather, the reactions are only with the surface-adsorbed water so that fine, particulate oxides in a stable form are not obtained. A stable hydrophobic material can be obtained only when a chemical reaction is involved. Only highly dispersed oxides which have been made hydrophobic by means of a true chemical reaction do not undergo extraction, e.g., from carbon tetrachloride by shaking with water. Those products which are not formed by chemical reaction with the OH groups are extracted into the aqueous phase since the carbon tetrachloride dissolves the organic molecules which are merely adsorbed off the surfaces of the oxides.

Attempts to alter the properties of a precipitated metal or metalloid oxide by making the same hydrophobic through reaction of the OH groups present on the surfaces thereof have not been lacking.

Thus, in the German Pat. No. 1,163,784, there is described a process for the surface treatment of highly dispersed metal and/or metalloid oxides which have free OH groups on their surfaces. The oxides may be homogeneous oxides, mechanical mixtures, mixed oxides or oxide mixtures. The oxides are obtained by thermal decomposition of volatile compounds of the metals and/or metalloids in vapor form in the presence of hydrolyzing and/or oxidizing gases or vapors. They are treated in uncondensed form and as freshly obtained from their formation. Prior to the treatment for making the oxides hydrophobic, the oxides are freed as far as possible of halogens, hydrogen halide and adsorptively bound water in the absence of oxygen. The oxides are then homogeneously mixed with substances capable of imparting hydrophobic properties to them and capable of reacting with the OH groups. For this purpose, they are introduced into a continuously operated reactor, which is in the form of a vertical tubular oven and which operates with concurrent flow, together with small amounts of steam and, advantageously, with an inert carrier gas. The reaction chamber is heated to a temperature between 200° and 800° C and, preferably, between 400 and 600° C. The resulting solid and gaseous reaction products are separated and the solid products are preferably deacidified and dried. Contact with oxygen is not effected until cooling to below about 200° C has occurred.

The surface treatment with the compounds which are capable of reacting with the OH groups must take place in the presence of small amounts of steam with the result that the thermally destroyed groups are reformed. It is recommended that about 0.5 to 2.0 m mol of water be introduced for each 100 m² of surface area of the oxide. The treating agent for the reaction is introduced in an amount dependent upon the surface area and the ultimate application. Highly dispersed silicic acid having a surface area of 200 m²/g has about 1 m mol/g of free OH groups. This would indicate that, theoretically, 1 m mol/g of reagent should be introduced for reaction therewith. In practice, however, it is advantageous to use 1.5 m mol/g of reagent.

In accordance with the above prior art process, any compounds which will react with the OH groups such as, for instance, by etherification, esterification or acetal formation, may be used as reactants for the surface treatment.

Suitable reactants include alcohols, aldehydes, ketenes, alkylene oxides and the like. Particularly good results are obtained if the oxide is reacted with the halide corresponding to the treatment compound. The finished oxides possess organophilic properties and can be dispersed in organic media such as, for instance, lacquers, with advantageous results.

The known agents capable of imparting hydrophobic properties can be used in order to obtain such properties. Preferably, alkyl, aryl or mixed alkyl-aryl halogensilanes are used and, most preferably, dimethyldichlorosilane is used. It is also possible to use the corresponding esters of the silanes. The latter do not produce optimally stable products but have the advantage that hydrogen halide is not split off when they are used thereby eliminating the necessity for deacidification.

The organophilic or hydrophobic fillers produced by the aforesaid processes find many uses, for instance, as free-flowing agents in powder systems, as fillers in special coating compounds, e.g., paint primers, and as fillers for plastics and elastomers such as natural and synthetic rubber.

However, fillers for use in silicone rubber have to meet additional requirements such as freedom from halogens and possession of a greater thickening effect than the above-mentioned hydrophobic products. Fillers for use in silicone rubber are, therefore, preferably formed by treating the oxides with organosiloxanes. To this end, a number of processes have become known for "coating" natural and synthetic fillers such as, for instance, silicic acid or materials containing the same. In these processes, the finely divided filler is mixed with a liquid siloxane or treated in a fluidizing bed with a finely dispersed siloxane, whereby more or less strongly adherent coatings are obtained on the filler surface. In order to obtain the optimum degree of adhesiveness between the filler particles and the agent which imparts hydrophobic properties, a chemical bond between the two is necessary. The prior art processes have not been acceptable because of apparatus limitations and the time required to adequately mix the components.

A prior art process (British Pat. No. 932,753, U.S. Pat. No. 2,803,617) makes use of an acid or like material as a reaction catalyst in order to economically carry out the reaction of pyrogenically produced silicic acid with siloxanes such as $D_4$ octamethylcyclotetrasiloxane, for example.

According to another known procedure, the reaction is carried out without pressure but the treatment of the silicic acid is effected in batches and involves extended residence times, e.g., 3–4 hours in certain stages of the process. Thus, a continuous process in an economical manner is hardly possible.

The object of the invention is to provide an arrangement which enables highly dispersed fillers to be produced in an economically and technically feasible manner, which enables fillers distinguished by their stability and optimal hydrophobic and organophilic properties to be produced and which enables fillers of particular suitability for use as additives in silicone rubbers to be produced.

SUMMARY OF THE INVENTION

In accordance with the invention, there is provided an arrangement for making hydrophobic highly dispersed oxides, mixed oxides or oxide mixtures of metals and/or metalloids obtained not only by pyrogenic reaction but also be wet precipitation. The arrangement is adapted for treatment of the oxide particles with vaporizable organosilicon compounds in the gas phase so as to form superior hydrophobic products entirely free of water, halogens and hydrogen halide. According to a characteristic feature of the invention, the arrangement is adapted for subjecting the oxide particles to treatment with a dry, inert gas stream in a fluidized bed for a period of a few seconds to a few minutes and, preferably, for a period of 1 to 60 seconds, at atmospheric pressure and at temperatures in the range of 600° to 1000° C, preferably 900° to 950° C, in order to absolutely dry the particles, that is, to free the particles of all physically and chemically bound water. The arrangement is further adapted to then charge the particles with gaseous linear and/or cyclic organopolysiloxanes, or mixtures of one or both of these types of polysiloxanes with an organohalogensilane, at temperatures from 25° to 650° C and, preferably, 25 to 350° C. The arrangement is also adapted to afterwards enable the oxide particles and the said organosilicon compounds to react at temperatures from 350 to 650° C and to thereafter treat the resulting product with a dry, inert gas stream in a fluidized bed and at temperatures from 500 to 125° C.

BRIEF DESCRIPTION OF THE DRAWING

The single FIGURE is a diagrammatic representation of an arrangement according to the invention.

DESCRIPTION OF THE PREFERRED EMBODIMENTS

The absolute drying of the oxide particles in the first step of the process serves to produce a surface quality which not only provides superior adsorptive bonds with the organosilicon compound but which also provides an optimal covering of the surface with the agent for imparting hydrophobic properties owing to the chemical reaction with the active surface.

This effect is best illustrated by using pyrogenically obtained silicic acid for exemplary purposes. The process of making pyrogenic $SiO_2$ results in a surface structure characterized by three types of so-called surface hydroxyl groups which are simultaneously present in each $SiO_2$ aerogel particle. These three types of hydroxyl groups are:

(a) Silanol groups present on the surface and which, because they are widely spaced, have no possibility of interacting with one another. There may, therefore, be designated isolated or "free" silanol groups.

(b) Silanol groups of the type set out under (a) which, however, are closely adjacent so that interaction can take place between them via hydrogen bridges. These are, therefore, designated "bounded (hydrogen bridged) silanol groups".

(c) hydroxyl groups which form part of the adsorbed water on the surface of the silicic acid aerogel.

During the short heat treatment of the oxide particles in the first step, the silanol groups of (b) and the hydroxyl groups of (c) are decomposed so that solely the free silanol groups of (a) remain thereby resulting in a highly active oxide particle.

The high activity manifests itself not only in the addition, i.e., adsorption, of reactive materials but also in the chemical reactions of the free silanol groups which take place much more readily and completely than in the case of conventionally dried aerogels. The products obtained by the heating in the first stage of the invention give rise to considerable quantities of reactive siloxane groups which, similarly to the silanol groups, are suitable for splitting reactive materials and then reacting therewith and which may also directly add to substances such as, for instance, polar XH compounds, e.g., alcohols, amines, etc.

The absolute drying in the first stage results in a highly active aerogel which is outstandingly sensitive to reactive materials and is thus eminently suitable for reaction with the agent which imparts the hydrophobic properties. This makes it possible to carry out all phases of the process, from the absolute drying to the subsequent procedure of making the particles hydrophobic, continuously in a single, upright, multiple-tube apparatus. The highly dispersed oxide is introduced at the top of the apparatus and the finished product is continuously withdrawn at the bottom thereof. The apparatus can be constructed of a single tube or of a plurality of tubes arranged by adding one to the other and at least some of which may be displaced relative to each other. Some parts of the apparatus may be heated whereas others may be unheated, there being at least one inlet for the agent which imparts the hydrophobic properties.

Suitable agents for imparting hydrophobic properties include linear and cyclic organopolysiloxanes and mixtures thereof. Examples of such agents are hexamethyldisiloxane ($M_2$), hexamethylcyclotrisiloxane ($D_3$), octamethylcyclotetrasiloxane ($D_4$), octamethyltrisiloxane (MDM) and decamethyltetrasiloxane ($MD_2M$).

Different agents for imparting the hydrophobic properties may be used in various stages of the process since, instead of the siloxanes listed, other compounds such as alkyl, aryl or alkyl-aryl monochlorosilanes, dichlorosilanes or trichlorosilanes may be used for the initial charging while siloxanes are used in the main reaction. It is also possible to introduce an organochlorosilane at one or more points of the apparatus and, simultaneously, to introduce a siloxane at one or more different points thereof. Furthermore, suitable mixtures of the named compounds or compounds similar thereto can be introduced through one, several or all of the various inlet points as a dust or in the gas phase.

The technical advantages of the process of the invention are derived from the fact that the process can be performed continuously. All interfering water is removed before the reaction. Water is not split off during the reaction which involves pre-dried oxide and polysiloxane and, since no water is present, there is no procedure necessary for separating the product at the end of the process. The reaction components can be accurately measured out and there is no need to remove excess polysiloxane at the end of the reaction. The only product discharged from the apparatus in the end is the desired material.

In the following description, pyrogenic silicic acid ($SiO_2$) and $D_4$ are used as examples, the $D_4$ serving as an agent for imparting the hydrophobic properties.

The reference numeral 1 designates an activating oven. Pyrogenic $SiO_2$ is introduced through an inlet 14 which opens into a cyclone 13 provided with a gas outlet tube 15 for the carrier gas. The cyclone 13 opens into a separating chamber 11 which, in turn, communicates with the activating oven 1.

In the separating chamber 11, there is provided a gas outlet tube 12 for the water vapor driven off from the $SiO_2$.

The carrier gas can either be taken off at 121 or fed over 122 to a drier 124 in which case the dry carrier gas can be conveyed through an upper circulation duct 123 to the activating oven 1 or to an annexed charge zone 2.

From the activating oven 1, the activated $SiO_2$ is delivered into a separator chamber 21 via a conduct 131. A feedpipe 102 opens into the upper part of the conduit 131 and the drying gas such as nitrogen, carbon dioxide, air or a suitable mixture of superheated steam with these gases is fed through the feedpipe 102 via a rotameter 10 and a heating oven 101. A feedpipe 16 extends from the lower part of the conduit 131 and nitrogen is fed in through the feedpipe 16 via a rotameter 161. The feedpipe 16 opens into a separating chamber 21 provided with a gas outlet tube 22 through which nitrogen and, if necessary, an excess of siloxane ($D_4$) from the annexed charge zone 2, can be discharged into a lower circulation duct 223 for use in a main reactor or reaction oven 3. A pump 221 is arranged in the gas outlet tube 22.

From the separating chamber 21, the $SiO_2$ is delivered into the charge zone 2 at the bottom of which there is arranged a radiation source 23 for UV light.

Beneath the UV light source 23, there is provided a conduit 24 for $N_2$, which latter passes through a rotameter 20, a preheater 201 and an evaporator 251 for the $D_4$. The $D_4$ is introduced into the evaporator 251 via a feedpipe 25, mixed with $N_2$ and then fed into the charge zone 2. The evaporator 251 is provided with a collecting vessel 252 for possibly unevaporated $D_4$.

The charge zone 2 is linked with the reaction oven 3 which, in turn, is joined with an after-treatment over 4 via a connecting conduit 331. A line 302 for $N_2$ opens into the connecting conduit 331 and the $N_2$ flows towards the connecting conduit 331 via a rotameter 30, a preheater 301 and a further evaporator 351 for $D_4$. The $D_4$ enters the evaporator 351 via a feedpipe 35 and is introduced into the connecting conduit 331 from the evaporator 351. The evaporator 351 is provided with a collecting vessel 352 for possibly unevaporated $D_4$.

As already mentioned, the after-treatment oven 4 is joined with the reaction oven 3 via the conduit 331. The after-treatment oven 4 decreases in temperature from the top downwardly and from a range of 500° to 250° C at the top thereof to a range of 250° to 125° C at the bottom thereof. The hydrophobic material leaves the after-treatment oven 4 via a take-off tube and a gate 431. Connected to the take-off tube of the after-treatment oven 4 is a conduit 401 through which $N_2$ can be introduced into the after-treatment oven 4 via a rotameter 40.

The gases supplied to the activating oven 1 can be introduced into the rotameter 10 from an external tube or can be recovered from the gas discharge tube 12 and, after drying, introduced into the upper circuit 123 to be admitted into the activating oven 1 via the rotameter 10. The gas such as nitrogen for the charge zone 2 can likewise be derived from the upper circuit 123 to be introduced into the charge zone 2 via the rotameter 20 or can be supplied to the rotameter 20 from an external tube. The gas such as nitrogen required for the reaction oven 3 can be introduced into the rotameter 30 from the lower circuit 223 for admission into the reaction oven 3 or can be supplied to the rotameter 30 from an external tube. For the after-treatment oven 4, $N_2$ carrier gas derived from the circuit 123 is continuously supplied to the rotameter 40 for admission into the after-treatment oven 4.

The process of the invention is carried out in the following manner:

An unthickened oxide aerogel coming directly from the production plant, or an optionally aged oxide aerogel or any finely divided, highly dispersed precipitated silica, is introduced into the top of the activating oven 1 and there, at temperatures from 750 to 950° C, converted into an absolutely dry product (Activation Stage I). The product is discharged into the unheated charging zone 2 from the bottom of the oven 1. The initial charging takes place in the charging zone 2, e.g., with organopolysiloxane ($D_4$) vapor having a temperature of about 300° to 350° C, (Charging Stage II). The thus-charged oxide is then introduced into the reaction oven 3 below the charging zone 2, the reaction oven 3 having a length of about 1–2 m and being heated to temperatures from 350° to 650° C. Further organopolysiloxane is supplied to the reaction oven 3. The main, i.e., essential, reaction takes place in this oven (Reaction Stage III). The after-treatment oven 4, having temperatures between 125° and 500° C, completes the reaction (After-treatment Stage IV) and the hydrophobic product obtained from this stage can then be packed or stored.

The individual zones are all incorporated into a single apparatus, i.e., a single unit is involved. The process can be carried out continuously. Preferably, a source of UV light is provided at the beginning of the main reaction zone or in the charging zone.

By means of a branched flow below the activation zone (I), it is possible to remove excess $D_4$ for recirculation into the charging zone (II) and the reaction zone (III). This will result in more effective feeding and, consequently, in better utilization of the $D_4$.

It will be understood that, in the after-treatment zone (IV), the product contains only chemically firmly bonded $D_4$. The excess $D_4$ which cannot serve any further useful in the operation of making the material hydrophobic can be recovered for recycling into the process.

Countercurrent flow should be used for the activation stage (I) and the after-Treatment Stage (IV) while the charging stage (II) and the main reaction stage (III) can also be carried out using concurrent flow.

In accordance with the invention, it is also possible to carry out the activation required for making the silicic acid hydrophobic in the reaction zone for the first time, i.e., activation and reaction can be carried out in a single operational step. In this embodiment, the starting silicic acid is subjected to activation by UV energy, preferably before its introduction into the common activation and reaction zone (III). The charging with $D_4$ can take place at the same time. Air or oxygen are to be avoided in this embodiment and nitrogen and/or carbon dioxide are preferred carrier gases. Of course, the breadth and scope of the possible variations depend considerably on the type of silicic acid to be made hydrophobic and, in particular, on the moisture content thereof.

In another variation of the process, the apparatus may consist only of the activation zone (I) and the charging zone (II). The $D_4$-charged $SiO_2$ can then, without contact with oxygen, be subjected to autoclaving at temperatures of 300°–400° C for about 1–2 hours to form stable hydrophobic products. In this manner, the removal of water and excess $D_4$ which are necessary in the conventional autoclave processes are avoided.

The conversion of the silicic acid starting material to a hydrophobic product requires less than 2 minutes in accordance with the first-described and principal embodiment. Thus, even with apparatus of small size, it is possible to obtain high productivity. This, by itself, represents a marked advance over the prior art processes which require at least 4 hours time to obtain a hydrophobic product.

The following Examples are given for the purpose of illustrating the invention and are not to be taken as limiting the same in any manner:

EXAMPLE 1

Pyrogenic silicic acid ("Aerosil"® of the Degussa Corporation of Germany) having a specific surface area of 200 $m^2/g$ (determined by the BET method) was treated with $D_4$ (octamethyltetrasiloxane) in the above-described apparatus.

The pyrogenic silicic acid was introduced pneumatically at a rate of 500 g/hr. In the charging stage, 7 ml/hr of $D_4$ in the form of an $N_2$–$D_{44}$ vapor mixture having a temperature of 300° C was blown in and, in the reaction stage, 7 ml/hr of $D_4$ in the form of an $N_2$–$D_4$ vapor mixture having a temperature of 300° C was blown in. The gas discharged from the charging stage was introduced into a condenser from which 35 ml or $D_4$ per hour was recovered.

The hydrophobic product discharged from the apparatus had a carbon content of 2.6% which corresponded to a $D_4$ content of 8%. It could not be wetted with water. After 2 hours of boiling with water in a reflux condenser, the product was still completely hydrophobic.

The oxides, as well as the polysiloxane vapors, are fed in with dry-pre-heated nitrogen. However, air may also be used as the carrier gas for the oxides. In the activation stage, pre-dried air may be used.

EXAMPLE 2

A pyrogenic, mixed $SiO_2/Al_2O_3$ type ("MOX")® oxide having an $SiO_2$ content of 98.3% and an $Al_sO_3$ content of 1.3% (both percentages calculated with respect to the dry material) and a specific surface area of 80 m²/g (determined by the BET method) was treated with $D_4$ (octamethyltetrasiloxane) as described in Example 1.

The hydrophobic product obtained had a carbon content of 1.6% which corresponded to a $D_4$ content of 5%. It was not wettable with water. After 2 hours of boiling with water in a reflux device, the product was still fully hydrophibic.

EXAMPLE 3

Example 1 was repeated as described therein. Instead of using nitrogen, however, a mixture of equal volumes of superheated steam and air at a temperature of 900° C was used in the activation stage (I). All other parts of the process were the same as described in Example 1.

The product obtained was exactly the same as the one obtained according to Example 1.

EXAMPLE 4

Example 1 was repeated as described therein. Instead of pyrogenic silicic acid precipitated silicic acid ("Wessedon" ® of the Degussa Company of Germany) having a specific surface area of 150 m²/g (determined by the BET method) was treated (particle size 144 mesh). The pneumatically introducing rate of the precipitated silica having a humidity of 10% by weight was 750 g/hr.

The introducing $D_4$ ratio was totally 120 g/hr. All other conditions were the same as in Example 1. No excess of $D_4$ was formed in the condenser for recovering.

The totally hydrophobic product discharged from the apparatus had a carbon content of 5.01% which corresponded to a $D_4$ content of 15.4%. It could not be wetted with water. After boiling with water as in Example 1, the product was still completely hydrophobic.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement for the treatment of particulate materials, particularly for the continuous treatment of oxides, to make them hydrophobic, comprising a tubular, substantially vertically arranged activating oven for activating a particulate material; means for the admission of said material into said activating oven, said admitting means communicating with an upper end of said activating oven; a separating chamber located below said activating oven; a first connecting conduit connecting a lower end of said activating oven with said separating chamber; a first inlet conduit for an inert gas communicating with said first connecting conduit; a second inlet conduit for an inert gas communicating with said first connecting conduit; a gas outlet conduit communicating with an upper end of said separating chamber; a charging conduit for charging said material with a substance capable of imparting hydrophobic characteristics to said material, said charging conduit communicating with a lower end of said separating chamber; a third inlet conduit for a mixture of an inert gas and said substance communicating with said charging conduit; a tubular, substantially vertically arranged reaction oven for reaction between said material and said substance, said reaction oven having an upper end communicating with said charging conduit; a second connecting conduit communicating with a lower end of said reaction oven; a tubular, substantially vertically arranged after-treatment oven for after-treatment of said material to eliminate excess of said substance, said after-treatment oven having an upper end communicating with said second connecting conduit; a fourth inlet conduit for a mixture of an inert gas and said substance communicating with said second connecting conduit; a material outlet conduit for removal of said hydrophobic material from said after-treatment oven, said material outlet conduit communicating with a lower end of said after-treatment oven; a fifth inlet conduit for an inert gas communicating with said material outlet conduit; a first flow meter communicating with said third inlet conduit for measuring the quantity of inert gas flowing through said third inlet conduit; a first preheater communicating with said third inlet conduit for preheating the inert gas flowing through said third inlet conduit prior to admission thereof into said charging conduit; first vaporizing means communicating with said third inlet conduit downstream of said first flow meter and said first preheater for vaporizing said substance prior to admission thereof into said charging conduit; a first admitting conduit for the admission of said substance into said first vaporizing means; a first collecting vessel communicating with said first vaporizing means for collecting unvaporized quantities of said substance; a second flow meter communicating with said fourth inlet conduit for measuring the quantity of inert gas flowing through said fourth inlet conduit; a second preheater communicating with said fourth inlet conduit for preheating the inert gas flowing through said fourth inlet conduit prior to admission thereof into said second connecting conduit; second vaporizing means communicating with said fourth inlet conduit downstream of said second flow meter and said second preheater for vaporizing said substance prior to admission thereof into said second connecting conduit; a second admitting conduit for the admission of said substance into said second vaporizing means; and a second collecting vessel communicating with said second vaporizing means for collecting unvaporized quantities of said substance.

2. An arrangement as defined in claim 1, said material being admitted as conveyed with a carrier gas; and further comprising cyclone means a region upstream of said activating oven, said cyclone means including an outlet for the withdrawal of said carrier gas.

3. An arrangement according to claim 1 including a radiation source for ultraviolet radiation located at the lower end of said charging conduit.

4. An arrangement according to claim 1, wherein said first inlet conduit for the admission of inert gas includes means for recycling at least a portion of withdrawn inert gas.

5. An arrangement according to claim 4 wherein said third inlet conduit for the admission of inert gas also includes means for recycling excess of said substance.

6. An arrangement according to claim 1, wherein said third inlet conduit for the admission of said substance includes means for recycling excess of said substance.

As already mentioned, the after-treatment oven 4 is joined with the reaction oven 3 via the conduit 331. The aftertreatment oven 4 decreases in temperature form the top downwardly and from a range of 500 to 250° C at the top thereof to a range of b 250 to 125° C at the bottom thereof. The hydrophobic material leaves the after-treatment ove 4 via a take-off tube and a gate 431. Connected to the take-off tube of the after-treatment oven 4 is a conduit 401 through which $N_2$ can be introduced into the after-treatment oven 4 via a rotameter 40.

* * * * *